United States Patent [19]

Foy et al.

[11] Patent Number: 5,320,185
[45] Date of Patent: Jun. 14, 1994

[54] AIRCRAFT FLUID DROP SYSTEM

[75] Inventors: Richard E. Foy, Medford; Oddgeir Uglum, Lake Oswego, both of Oreg.

[73] Assignee: Erickson Air-Crane Co., Central Point, Oreg.

[21] Appl. No.: 898,506

[22] Filed: Jun. 15, 1992

[51] Int. Cl.$^5$ .................... A62C 31/00; B64D 1/16
[52] U.S. Cl. ........................... 169/43; 169/53; 244/136; 222/55
[58] Field of Search ............. 169/53, 43, 47, DIG. 1; 222/55; 244/136, 135 C, 135 R; 239/171, 67-69, 155, 156

[56] References Cited

U.S. PATENT DOCUMENTS

| | | |
|---|---|---|
| 3,598,342 | 8/1972 | Hawkshaw . |
| 3,754,601 | 8/1973 | Linkewich ..................... 169/53 X |
| 3,901,467 | 8/1975 | Hawkshaw ..................... 169/53 X |
| 4,382,568 | 5/1983 | Schertz . |
| 4,545,403 | 10/1985 | Vischer et al. . |
| 4,671,472 | 6/1987 | Hawkshaw . |
| 4,936,389 | 6/1990 | MacDonald et al. . |

FOREIGN PATENT DOCUMENTS 642066  8/1950  United Kingdom ................ 244/136

OTHER PUBLICATIONS

The Automatic Throttle Hose—A Device to Keep Reservoir Discharges Constant, German Journal Wasserwirtschaft, No. 12, 1979, German Language.

*Primary Examiner*—David M. Mitchell
*Assistant Examiner*—Andrew C. Pike
*Attorney, Agent, or Firm*—Kolisch Hartwell Dickinson McCormack & Heuser

[57] ABSTRACT

A fluid drop system for an aircraft for use in firefighting is described The preferred embodiment uses electronic control circuitry coupled with a hydraulic controller that opens and closes the fluid tank's door panels to rate-control fluid drops based on fluid volume remaining in the tank. The circuitry produces a command generated drop rate profile based upon manual drop rate and drop fraction selector controls. It does so by constant comparison of the instantaneous volume of fluid remaining in the tank with a predetermined, desired instantaneous remnant volume in accordance with a defined, declining-volume profile, e.g. one defining a constant drop rate. A stabilized feedback control circuit ensures that, at any instant of time, the opening in the tank's door panels releases a volume of fluid that will maintain the remnant tank volume equal to the desired tank volume. Such variable forces on the fluid as inertia, acceleration, declining mass and splashing automatically are compensated for by the feedback-based fluid drop rate control circuitry. External variables such as aircraft groundspeed, heat intensity, etc. may be taken into account, thereby to render highly controllable and accurate fluid drops for effective and efficient fire fighting operations.

11 Claims, 3 Drawing Sheets

AIRCRAFT FLUID DROP SYSTEM

BACKGROUND AND SUMMARY OF THE INVENTION

The present invention relates generally to fluid drop systems for use in aircraft. More particularly, the invention concerns such a system that includes a fluid-fillable tank having openable/closeable door panels and fluid volume sensor, an operator's panel for selecting a drop rate and volume and a controller responsive to the sensor and the panel for controllably opening and closing the door panels to release the fluid, e.g. for fire-fighting. An alternative system further includes an aircraft groundspeed sensor and the controller also is responsive thereto yet to control fluid release in relation to actual groundspeed.

Known aircraft fluid drop systems control door panels by incrementally opening them to release fluid, based upon the level of fluid remaining within the tank. Due to numerous unaccounted for variables, e.g. mechanical linkages and their associated response delays, fluid inertia at the start of drops, and fluid mass changes, fluid sloshing within the tank and changes in the groundspeed of the aircraft during drops, known drop systems are notoriously incapable of accurately controlling the fluid drop rate. In demanding applications such as firefighting, such inaccuracies result in great inefficiencies in terms of ground coverage by the very limited volume of water and fire retardant mixture that can be airlifted by such aircraft. Variation in aircraft groundspeed is entirely unaccommodated by prior art systems and is exacerbated by the increasing use of helicopters, which are capable of turning and banking relatively quickly to avoid hazards such as intense heat, trees and utilities.

The use of fluid level or pressure (head) within the tank as a basis for rate controlling the release of fluid is particularly susceptible to producing inaccurate fluid drop rates. Primarily, this is because level or head control assumes that the behavior of fluid in the tank is static. In fact, fluid within the tank is subject to many dynamic forces including inertia; acceleration due to gravity; fluid sloshing; aircraft acceleration; and mechanical linkages and their relatively slow responses to control stimuli. Such forces are variable and generally act upon the fluid release system throughout its operation even during a fractional tank volume fluid drop. One seemingly desirable solution to the problem would be to use a flow rate sensor associated with the tank, but such is not possible due to the relatively long openings, e.g. more than eight feet, defined by the door panels of known drop tanks.

The present invention in its preferred embodiment uses sophisticated electronic control circuitry to rate control fluid drops based on fluid volume. It does so by constant comparison of the instantaneous volume of fluid remaining in the tank with a predetermined, desired instantaneous remnant volume in accordance with a defined, declining volume profile. In accordance with the preferred embodiment described and illustrated herein, the operator panel permits a user to select one of three different, constant drop rates, e.g. 75, 300 or 700 gallons/second (gps), and one of four different drop fractions, e.g. 25, 50, 75, or 100%. Of course, more, fewer or different drop profiles, rates and fractions, within the spirit of the invention, readily may be accommodated.

These and additional objects and advantages of the present invention will be more readily understood after a consideration of the drawings and the detailed description of the preferred embodiment.

DETAILED DESCRIPTION OF THE PREFERRED EMBODIMENT

Figure 1:
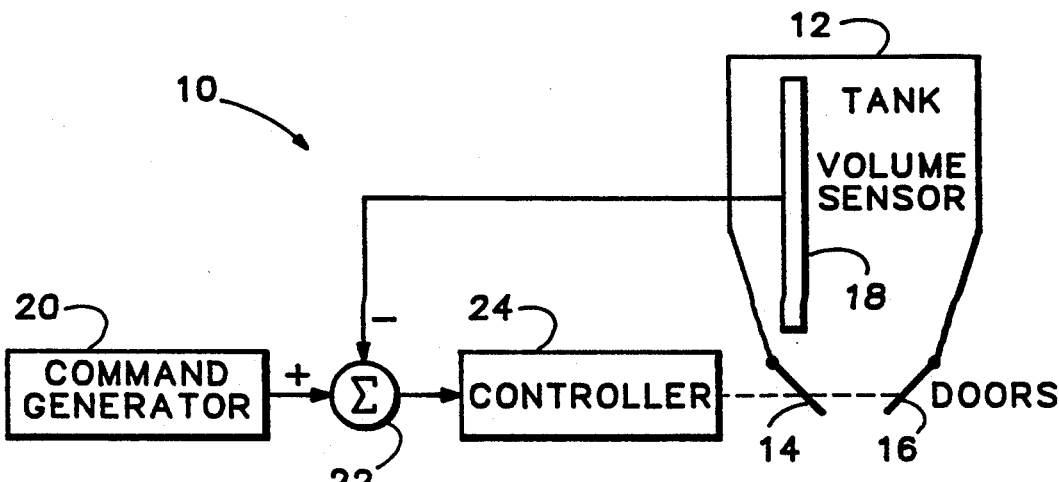
FIG. 1 is a schematic block diagram illustrating the principal on which the invention operates.

FIG. 1 is a greatly simplified schematic block diagram that illustrates the principal on which the fluid drop, or flow control, system of the invention, indicated generally at 10, operates. System 10 includes a tank 12 having a pair of openable/closeable door panels, or doors, 14, 16 (which define a variable opening of tank 12) and a fluid volume sensor 18 for sensing the volume of fluid remaining within tank 12 and producing a signal representative thereof. System 10 also includes a drop rate command generator 20 for producing a signal representative over time of a predefined target remnant volume signal, and a door panels controller capable of controllably opening and closing door panels 14, 16. System 10 also includes a comparator, indicated in FIG. 1 as a summer, 22, for comparing the signal generated by volume sensor 18 and the signal generated by command generator 20 to produce a sum signal inputted to a controller 24 for the opening and closing of door panels 14, 16.

Those skilled in the art will appreciate that, with volume sensor 18 and command generator 20 producing signals properly calibrated and signed, the sum of the two signals represents a comparison of, or the difference between, the two signals. Accordingly, for an understanding of the invention, it is necessary to appreciate that the signals produced by volume sensor 18 and command generator 20 are of opposite sign, as indicated in FIG. 1, and of equal magnitude in the steady-state, initial condition of system 10. For purposes of this discussion, it will be assumed, for example, that when tank 12 is full of fluid, volume sensor 18 produces a +10-volt, direct current (+10-VDC) signal, and that at the start of a fluid drop, command generator 20 produces a −10-VDC signal. The result of their comparison, i.e. the sum signal produced by summer 22 into controller 24, is a 0-VDC signal that maintains the fully closed position of door panels 14, 16. So, it will be understood that summer 22 acts preferably as a differencer, or comparator, between (by the opposite-sign configuration, or reverse polarity of) its inputs from volume sensor 18 and command generator 20. In other words, the comparator continuously compares remnant fluid volume with the predefined profile and produces feedback to controller 24 proportional to the difference therebetween.

Figure 2:
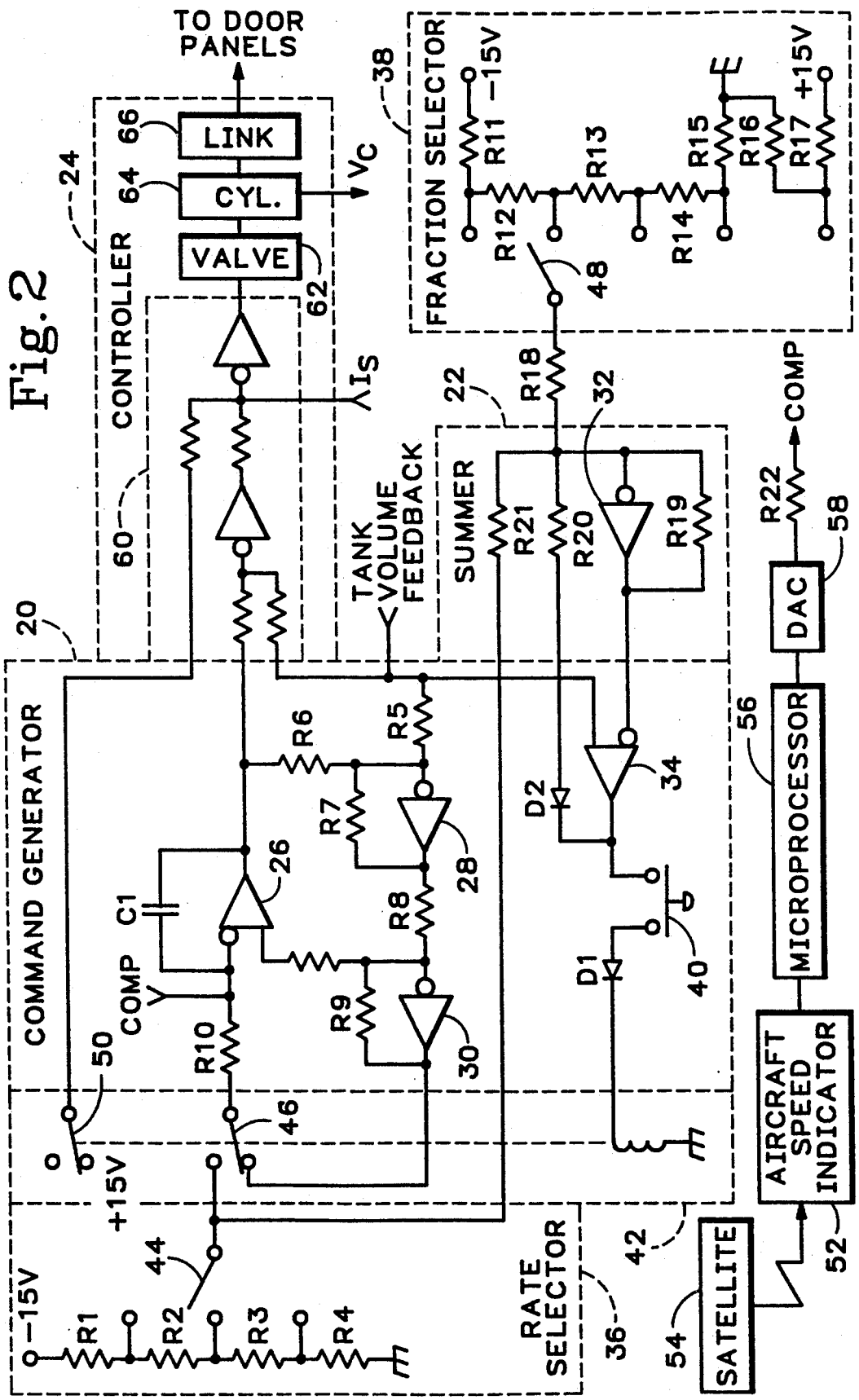
FIG. 2 is a schematic block diagram of the invention made in accordance with the preferred embodiment of the invention.

Turning now to FIG. 2, a complete schematic block diagram of system 10 is seen to include the system components illustrated in FIG. 1 and others, which together more fully explain how system 10 controllably dispenses fluid from tank 12 in an aircraft. It will be appreciated that all of the components of FIG. 1 are identically designated in FIG. 2, although they may be illustrated in FIG. 2 somewhat differently and in more detail. Command generator 20 and summer 22 may be seen to include a ramp-generating operational amplifier (op amp) 26, series-connected feedback op amps 28, 30, a summing op amp 32 and a comparator op amp 34, as well as associated biasing and conditioning circuitry to be described below. They also may be seen to include a manually operable flow or drop rate selector 36 and a manually operable flow or drop fraction selector 38 to which command generator 20 is responsive. Finally, they may be seen to include a normally open, manual, momentary (e.g. pushbutton) drop switch 40 and a relay 42.

Those skilled in the art will appreciate that omitted from FIG. 2 for the sake of clarity are second, reference level inputs to op amps 26, 28, 30, 32, which typically are grounded through resistors having appropriate values. Rate selector 36 preferably includes a resistor divider network including resistors R1, R2, R3, R4 that effectively tap −10.0-V, −4.29-V and −1.07-V from a −15.0-V reference supply to permit the manual selection of 700-gps, 300-gps and 75-gps drop rates, respectively. The selection is made via a manually operable control panel switch 44, which is connected to the normally open side of a first switch 46 of the pair of ganged switches that form a switching means part of relay 42. Until drop switch 40 is actuated, relay 42 maintains switch 46 in a first illustrated position such that there is no input to op amp 26 from rate selector 36, but instead there is input thereto only from feedback op amp 30.

Op amps 28, 30 having unity gain and being 180° out of phase from one another ensure that the illustrated steady-state condition of command generator 20 is balanced. In other words, no matter what the volume of fluid in tank 12 as measured by volume sensor 18, the output voltage level of integrator op amp 26 is equal in magnitude, but opposite in sign, to the level of the signal produced by sensor 18 such that their sum at the summing junction input to op amp 28 (and, in turn, the input to integrating op amp 26) is zero. A stable balance is achieved in accordance with the preferred embodiment of the invention by 100-kilohm (100-kΩ) input resistors R5, R6, feedback resistor R7, series input resistor R8 and feedback resistor R9. In accordance with the preferred embodiment of the invention, the DC voltage level produced by volume sensor 18 is between −0-V and +10-V, respectively corresponding to an empty and full fluid tank 12.

Those skilled in the art will appreciate that, so long as system 10 is in this steady-state, idle condition in which there is no drop taking place, the output voltage level of integrator op amp 26 is equal in magnitude and opposite in sign to the signal produced by volume sensor 18. Stated another way, system 10 is configured such that the sum of the (relatively negative) command generator output signal and the (relatively positive) tank volume sensor feedback signal is zero. As will be seen, this condition prevails at all times when there is no fluid drop in progress. More importantly, this condition prevails also at substantially all times during a fluid drop, thus achieving nominally at all times an ideal condition in which the difference between the command volume ramp determining the desired (declining) tank fluid volume and the actual tank volume represented by the volume sensor is minimized.

Referring still to FIG. 2, it now will be understood how system 10 operates during a fluid drop. Upon momentary closure of drop switch 40, relay 42 is activated to change the positions of switch 46 forming a part thereof. By this changed position of switch 46, the input via a resistor R10 to integrator op amp 26 is a DC voltage level determined by the position of rate selector switch 44. Integrator op amp 26 equipped in its feedback path with a capacitor C1 produces an increasing, straight-line ramp voltage at its output that is directly proportional to the DC input voltage. In other words, the output of integrator op amp 26 will begin ramping up from the selected negative voltage such as −10.0-V toward zero volts at a rate determined by the R-C time constant of resistor R10 and capacitor C1. This time constant of course is fixed such that a full tank 12 would be emptied at the highest drop rate, e.g. 700-gps, when the input voltage to integrator op amp 26 is at a minimum, e.g. −10.0-V. It will be appreciated that any number and value of plural drop rates straightforwardly may be established by choosing appropriate values for n resistors R1 through Rn, e.g, R1 through R4 of rate selector 36.

Fraction selector 38 preferably includes a resistor divider network including resistors R11, R12, R13, R14, R15, R16, R17 that effectively tap −10.0-V, −7.5-V, −5.0-V, −2.5-V, +2.0-V from ±15.0-V reference supplies to permit the manual selection of 0% (no drop), 25%, 50%, 75%, 100% (full load) drop fractions, respectively. The selection is made via a manually operable control panel switch 48, which is connected via a series 100-kΩ resistor R18 to the input of unity gain, 180° phase-shifting op amp 32 having an associated, balancing feedback resistor R19. The input to op amp 32 acts as a current summing junction, as will be seen, that permits summer 22 very conveniently and simply to provide compensation for various conditions that affect the operation of drop system 10.

Considering first an idealized operation of command generator 20, summer 22 and fraction selector 38, it is necessary to assume that other signals inputs to the summing junction make no contribution. Under such a simplifying assumption, it may be seen that a DC voltage level directly proportional to that which is selected by the position of switch 48 appears at the input to op amp 32. For example, if a 50% drop fraction is selected by the operator, and if tank 12 is full, then the −5-V input to op amp 32 is effectively inverted thereby and presented as a +5-V level to the negative input of op amp 34. The tank volume feedback signal from volume sensor 18 is +10-V. As a result, the output from op amp 34 is sufficiently positive that, upon the momentary closure of drop switch 40, a diode D1 will become forward biased and will energize series-connected relay 42. It will be understood that, for the sake of clarity and brevity, conventional relay hold-up and relay protection diodes and associated circuit components are not shown in FIG. 2.

When drop switch 40 is closed, switch 50 changes to an open position and switch 46 changes position also, thereby causing integrator op amp 26 to produce a ramp-up voltage that, in turn, causes door panels 14, 16 to open. Immediately, the volume of fluid remaining in tank 12 begins to go down, represented by a decrease in the voltage level of the tank volume feedback signal produced by sensor 18. When this feedback voltage level reaches +5-V, the output of op amp 34 reaches a zero-crossing (from a positive to a negative voltage) and the relay is de-energized to return switch 46 to the position shown in FIG. 2. Simultaneously, switch 50 returns to its position shown in FIG. 2 to route +15-V to controller 24, essentially bypassing command generator 20 and acting directly on the output circuit that controls door panels 14, 16 to close them as quickly as possible after balance, represented by such zero-crossing, is reached. Now the remaining tank fluid volume is 50%, as desired.

The operation of command generator 20 and summer 22 similarly accommodates alternative drop fraction selections. A special case is presented when it is desired to drop a full load, i.e. to empty the tank (selected drop fraction =100%): The voltage level into op amp 32 is made slightly positive (e.g. +2-V) such that balance never will be achieved, and such that door panels 14, 16 will remain fully open until tank 12 is completely empty, as determined after a predefined time interval. Clearly, more, fewer or alternative drop fractions may be provided, within the spirit of the invention.

One condition for which summer 22 in its preferred embodiment provides compensation is the splashing of fluid within tank 12 that may result, for example, from abrupt door panel opening or closure, or from abrupt aircraft altitude variations, producing corresponding variations in the DC voltage level output by volume sensor 18. Hysteresis is provided by a normally reverse-biased diode D2 and a series-connected 3.3-MΩ resistor R20 that feeds back a fraction of the signal level at the output of op amp 34 into the summing junction at the input of op amp 32. Diode D2 will be understood to ensure that there is compensation only when the output of op amp 34 goes negative (i.e. when balance is reached). It will be appreciated by those skilled in the art that the level of this compensation signal is not critical, but preferably is large enough to mask the largest expected fluid splash and yet smaller than the smallest fraction selector current increment. It may be seen that controller 24 comprehends the tendency of the opening of tank 12 to oscillate, e.g. in response to splashing or sloshing of fluid therein, and produces a flow control signal that reduces such tendency.

Another condition for which summer 22 provides compensation in accordance with the preferred embodiment of the invention is a slight latency, or response delay, between the moment it is determined that the door panels 14, 16 must be closed (at the end of a selected drop) and the moment door panels 14, 16 are actually closed. If this latency were uncompensated, it would result in late closure of door panels 14, 16 and a fluid drop of more than the selected drop fraction. Accordingly, the closure requirement is anticipated slightly so that timely closure is provided. This is accomplished by a 1-MΩ sense resistor R21 connected between switch 44 and the summing junction input to op amp 32. The amount by which achievement of balance (the positive-to-negative voltage excursion, or zero-crossing, of the output of op amp 34), and thus closure of door panels 14, 16, is advanced in time preferably is proportional to the selected drop rate. This is why resistor R21 is connected to the switch-selected output of rate selector 36 to produce the advanced closure signal that is added/subtracted at the summing junction. Thus, resistor R21 coupling the output of switch 44 with op amp 32 may be thought of as signal-producing means for time-advancing closure of the opening of tank 12, thereby to pre-compensate for inherent mechanical delay in the closure thereof.

Importantly, system 10 in its preferred embodiment facilitates compensation for various conditions such as the groundspeed of the aircraft in which it is installed. Typically, an aircraft approaches a ground fire at various groundspeeds, as dictated by terrain. It is believed that, during a fluid drop, the forward groundspeed of an aircraft decreases due in part to the aerodynamics of the craft and due in part to the loss of fluid mass during the drop. This non-vertical component of the aircraft's velocity, the aircraft's groundspeed, can be compensated for by the preferred embodiment of the invention by the relatively straightforward addition, at a summing junction at the input to op amp 26, of the output of rate selector 36 and a COMP signal proportional to such groundspeed. Such groundspeed compensation signal COMP can be derived from a conventional global positioning system (GPS), or aircraft position indicator, or groundspeed sensor, 52 responsive to plural airborne transmitters such as those indicated by satellite block 54. It will be understood that the aircraft position indicator is of conventional design (with its use heretofore limited to aircraft navigation), and is capable of outputting an American Standard Code for Information Interchange (ASCII) data stream, in accordance with predetermined hardware (RS-232C) and software interfaces and protocols, wherein the data includes an aircraft groundspeed indication.

As illustrated in FIG. 2, the digital output of indicator 52 may be monitored by a digital controller, e.g. a microprocessor 56 having an electrically programmable read-only memory (EPROM)-based control firmware and read-and-write memory (RAM) including speed data buffers, to extract the aircraft groundspeed data from the data stream. The groundspeed data may be normalized and scaled by microprocessor 56 and the normalized and scaled data may be converted by a digital-to-analog converter (DAC) 58 into an analog signal that is suitable as a groundspeed-compensating signal. Such signal may be summed at the summing junction input to op amp 26, as illustrated, via a series resistor R22, thereby to provide aircraft groundspeed compensation to fluid drop rate controller 24.

It may be seen now that preferably controller 24 is responsive not only to a first sensor that indicates fluid volume, but also to a second sensor that indicates aircraft groundspeed. Because command generator 20 includes op amps 26, 28, it is responsive to the flow dynamics of a fluid volume being emptied from tank 12 (via the TANK VOLUME FEEDBACK signal shown in FIG. 2), and it also is responsive to the speed dynamics of the aircraft carrying such tank 12 (via the COMP signal shown in FIG. 2). Thus, controller 24, being coupled with command generator 20, produces a flow control signal that is comprehensive of such flow and speed dynamics.

Those skilled in the art will appreciate that other variables affecting the fluid drop rate may be comprehended by controller 24 by straightforwardly introducing signals representative thereof into the same summing junction at the input to op amp 26, in suitable proportion to the contribution of other compensatory signal inputs. For example, the heat intensity of a fire may be sensed by a heat sensor to develop a signal proportional thereto that when added to the input of op amp 26 of command generator 20 causes the fluid drop rate to be appropriately higher or lower. Such alternative external variable compensation is contemplated by, and is intended to be within the scope of, the invention.

Those skilled in the art also will appreciate that microprocessor 56 and DAC 58 may be combined with an analog-to-digital converter (ADC) to perform in digital fashion many or all of the functions of command generator 20, summer 22, controller 24, rate selector 36 and fraction selector 38 to provide a digital embodiment of the invention having substantially identical functionality to the preferred hybrid system 10 described and illustrated herein. Such alternative embodiments are, of course, within the contemplation and scope of the invention.

Referring still to FIG. 2, controller 24 may be seen generally to include an operatively coupled tank opening control mechanism including a hydraulic power amplifier, 60 for varying the opening of tank 12 controllably to dispense fluid therefrom in accordance with the predefined profile. Amplifier 60 preferably comprises a first op amp having at its input a current summing junction formed by two resistors connected as shown. Amplifier 60 also preferably comprises a series-connected second op amp also having at its input a current summing junction formed by two additional resistors connected as shown and by $I_S$. Amplifier 60 preferably is operatively connected with a servo positioning valve 62 (having an internal coil, with current feedback) and a hydraulic cylinder 64 that operates a typically non-linear linkage unit 66 connected to door panels 14, 16. Cylinder 64 produces a voltage $V_C$ that is proportional to the position of the rod of cylinder 64 between its two extreme, which voltage $V_C$ is used as an input to a feedback control loop stabilizing circuit, as will be described by reference to FIG. 3. It will be understood that, although not shown in FIG. 2, the control mechanism also may be thought to include fluid volume sensor 18, as shown in FIG. 1. Thus, sensor 18 coupled with op amps 28, 30, 32 via the signal TANK VOLUME FEEDBACK control signal may be seen to form a feedback circuit that couples the control mechanism with controller 24 (via op amp 26) to produce what is generally referred to as closed-loop feedback.

Preferably, controller 24 includes a tank simulator circuit—believed to be conventional, and thus not detailed herein—that is used to facilitate system 10 calibration and test without dedicating fluid and aircraft resources thereto. Not shown in FIG. 2 and forming no part of the present invention are power supply, distribution, decoupling and noise-suppression, test points and indicator circuits, which are conventional.

Figure 3:
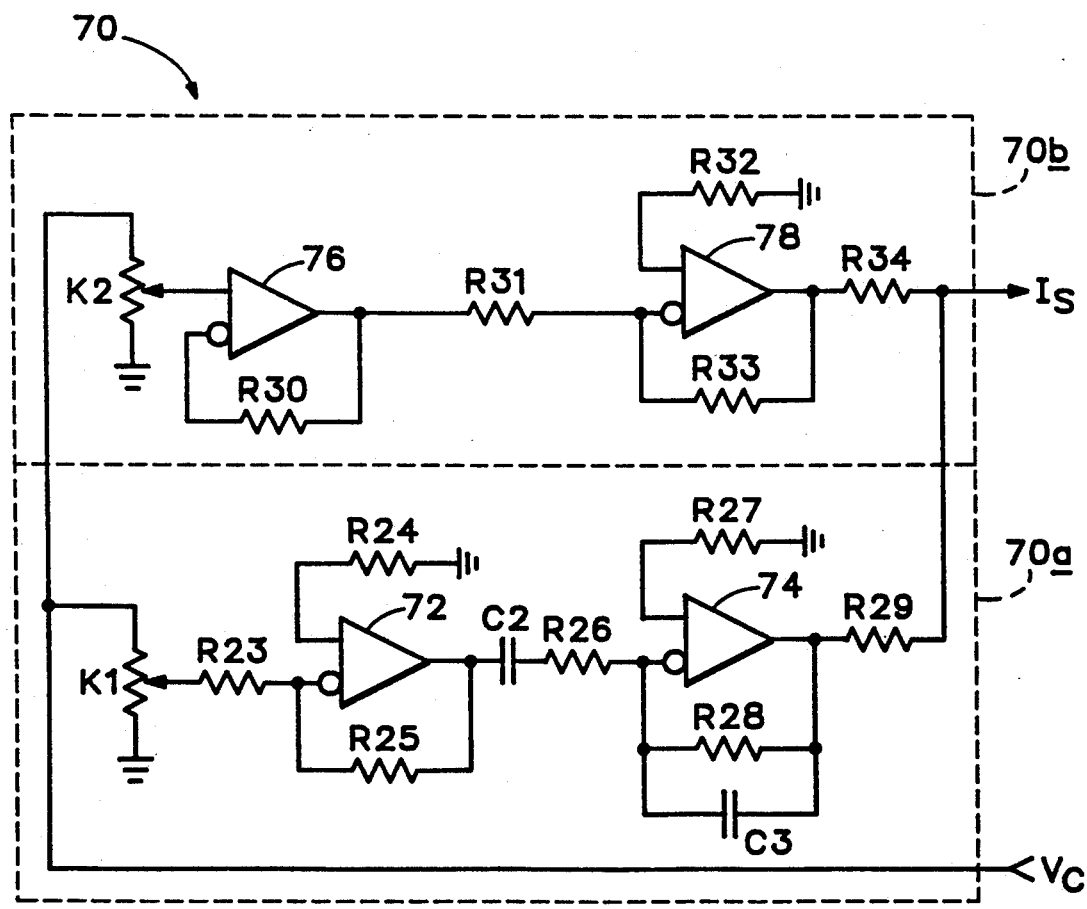
FIG. 3 is a detailed schematic diagram of the stabilizing circuit that forms a part of the invention shown in FIG. 2.

Referring now to FIG. 3, it will be understood how, in accordance with the preferred embodiment of the invention, the feedback circuit shown in FIG. 2 is stabilized. It will be appreciated that the overall control loop including the power amplifier, the hydraulic cylinder, the non-linear door panels linkage mechanism and the panels' opening to produce a fluid volume decrement represented by volume sensor 18 defines a non-linear transfer function the dynamic part of which represents a time constant and two integrations. Such a feedback control system is inherently unstable. Accordingly, a stabilizing circuit 70 is provided as shown in FIG. 3 that represents a suitable modification to the feedback control system to render it stable.

Stabilizing circuit 70 preferably includes a derivative stabilizer 70a and a proportional stabilizer 70b in parallel/serial and parallel combination. The input to derivative stabilizer 70a and to proportional stabilizer 70b is $V_C$, at a voltage level preferably between 0-V and +15-V when the rod of cylinder 64 is between its extreme positions of respectively closing and opening door panels 14, 16. The common output of derivative stabilizer 70a and proportional stabilizer 70b is a stabilizing signal $I_S$, which is operatively connected to the output of op amp 26 to produce a signal that controls valve 62.

Derivative stabilizer 70a preferably includes a calibration potentiometer K1 the wiper of which taps a portion of $V_C$ and inputs it via a resistor R23 to the negative input of a first op amp 72 the other input of which is grounded via a resistor R24. A feedback resistor R25 of the same value as that of R23 causes op amp 72 to act as a unity gain, phase-reversing amplifier. The output of op amp 72 is AC-coupled via a series capacitor C2 to the negative input of a second op amp 74 via a series resistor R26. The other input of op amp 74 is grounded via a resistor R27. A resistor R28 and capacitor C connected in parallel provide the feedback path for op amp 74, the output of which is connected via a resistor R29 in common with the output of proportional stabilizer 70b to produce the feedback-stabilizing current signal $I_S$. Those of skill in the art will appreciate that derivative stabilizer 70a is so-called because, so long as the input voltage $V_C$ does not change faster than a predetermined rate, capacitor C2 blocks current into op amp 74, which then contributes no stabilization current to $I_S$.

Proportional stabilizer 70b preferably includes a calibration potentiometer K2 the wiper of which is connected to the positive input of a first op amp 76 having connected therewith a feedback resistor R30. The output of op amp 76 is series connected via a resistor R31 to the negative input of a second op amp 78 the other input of which is grounded via a resistor R32. A feedback resistor R33 connects the output of op amp 78 to its negative input terminal. The output of op amp 78 is connected via a series resistor R34 to the common junction with R29 of derivative stabilizer 70a to produce signal $I_S$. Those skilled in the art will appreciate that proportional stabilizer 70b contributes a current at the summing junction that is inversely proportional to cylinder 64-produced feedback voltage $V_C$.

Potentiometer, resistor and capacitor values that have been found to produce the desired stabilization of the feedback control loop in system 10 are as follows, although of course other suitable values, as well as other stabilizing circuit topologies, may be used: K1, K2 are 25-kΩ; R23, R25, R29, R31 and R34 are 100-kΩ; C2 is 0.47-microfarad (μF); R26 is 4.7-kΩ; C3 is 0.0033-μF; R24, R27 and R32 are 47-kΩ; R28 is 470-kΩ; R30 is 15-kΩ; and R33 is 82-kΩ. Op amps 72, 74, 76, 78 preferably are low-power LM324N devices, or equivalent, although of course other circuit devices may be used.

Figure 4:
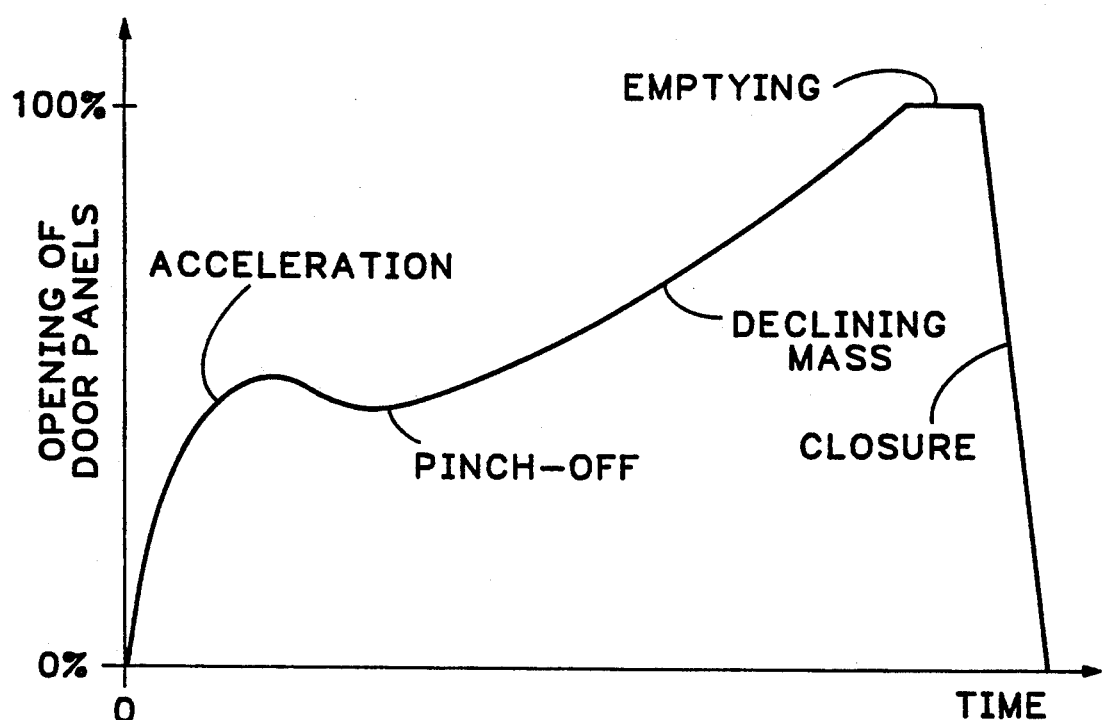
FIG. 4 is a graph illustrating a door panels opening versus time curve that is believed to aid in understanding the invention.

Referring now to FIG. 4, it will be appreciated that the curve qualitatively illustrates the percentage over time by which door panels 14, 16 might be opened in order to effect a desired, e.g. constant, fluid drop rate. The curve will be understood not to be drawn to scale in either axis, but nevertheless is believed to be helpful in understanding the invention. A portion of the curve labeled ACCELERATION may be seen to have a positive, declining slope that generally describes a first period of time during which the fluid volume in tank 12 is being accelerated from rest, or its inertial state, by gravity and during which the opening of door panels 14, 16 preferably is opening widely and then slightly less so. A portion of the curve labeled PINCH-OFF may be seen to have a negative, increasing slope that generally describes a second period of time after which the fluid volume has overcome its inertia and during which door panels 14, 16 preferably are relatively closing to slow down the rate at which fluid is dropped. A portion of the curve labeled DECLINING MASS may be seen to have a positive, increasing slope that generally describes a third period of time during which the mass of the fluid is decreasing and during which the opening of door panels 14, 16 preferably is increasing to deliver a constant fluid drop rate.

A linear portion of the curve labeled EMPTYING may be seen to have a constant, zero slope that generally describes a fourth, predefined period of time during which door panels 14, 16 are maintained in a fully open position, thereby to ensure that tank 12 is completely emptied of remnant fluid. A terminal, linear portion of the curve labeled CLOSURE may be seen to have a negative, constant slope that generally describes a terminal period of time after a drop (or fractional drop) is complete when door panels 14, 16 preferably are closing from a previously wide open position. The various inflection points along the curve represent the realities of the relatively complex fluid dynamic, flight dynamic and mechanical factors that impact on tank-type fluid drop systems, but that heretofore have been ignored in the design of such systems.

Figure 5:
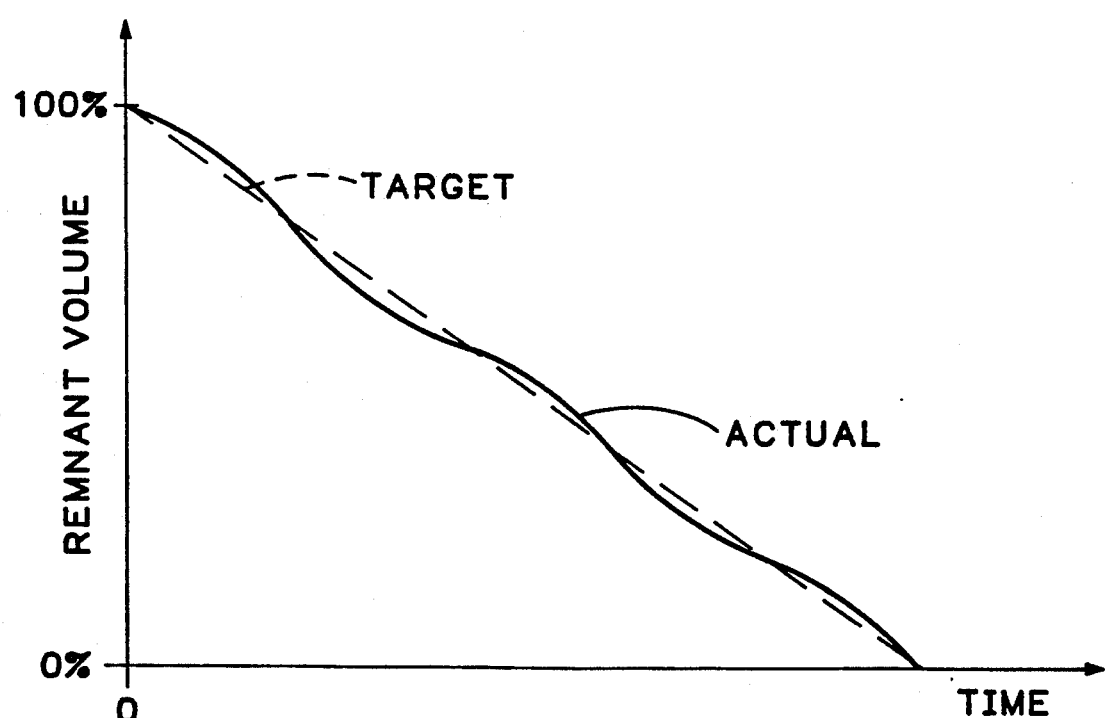
FIG. 5 is a graph illustrating a target and an actual remnant fluid volume versus time curves that are believed to aid in understanding the invention.

Referring finally to FIG. 5, it will be appreciated that the curves qualitatively illustrate the TARGET (dashed line) and ACTUAL (solid line) remnant fluid volume over time in order to effect a desired, e.g. constant, fluid drop rate. The curves will be understood not to be drawn to scale in either axis, but nevertheless are believed to be helpful in understanding the invention. The TARGET remnant fluid volume within tank 12 is represented by a negative slope straight line, as illustrated. The ACTUAL remnant fluid volume within tank 12 is represented by a curvilinear approximation of the same straight line, as illustrated, with the differences therebetween representing the non-ideal nature of closed loop feedback control systems in operation preferably being minimal.

Only when such variables as fluid splashing and sloshing, aircraft vertical acceleration, fluid volume acceleration and imperfect mechanical linkages are taken into account, as by the preferred method and system of the invention herein disclosed, can such near ideally constant fluid drops (or drops of an alternative, predefined, linear or non-linear function of time) be achieved. It may be seen from FIG. 5 that the remnant fluid volume represented by the what is referred to herein as a predefined profile is declining at a fixed rate over time, in accordance with the preferred embodiment. Those of skill in the art will appreciate that alternative profiles may be used, depending upon the desired characteristics of a particular fluid drop.

Those of skill in the art will appreciate that system 10 is highly responsive to variable fluid and flight dynamics, and that its operation provides unprecedented accuracy in controlling fire retardant fluid drop rates to produce more effective and efficient ground cover in fighting fires. Yet it does so with a minimum of circuitry in a very reasonable volume and at very reasonable cost, both of which are less than with less effective prior art systems. No longer with the present invention will fluid drop rates vary from a desired profile with vertical or horizontal acceleration of the aircraft, with progressively decreasing fluid level in the tank, with the selected fractional volume of fluid being dropped, with the selected nominal fluid flow rate, with the relatively wide or narrow opening of the tank door panels, with the splashing and/or sloshing of fluid within the tank or with the nonlinear mechanical linkages that typify tank door panel subsystems.

The preferred method of the invention now may be understood. The preferred method of controlling the rate at which fluid is dropped from a fire-fighting aircraft involves 1) periodically sensing the groundspeed of an aircraft equipped with a fire retardant fluid reservoir, e.g. tank 12, during an overflight by such aircraft, to produce a groundspeed-indicating signal proportional thereto, e.g. COMP; and, responsive to such signal, 2) modifying the rate at which fluid is dropped from such reservoir, e.g. via the summing junction at the input to integrator op amp 26, thereby to maintain a substantially constant fluid drop rate during the overflight.

While the present invention has been shown and described with reference to the foregoing operational principals and preferred method and embodiment, it will be apparent to those skilled in the art that other changes in form and detail may be made therein without departing from the spirit and scope of the invention as defined in the appended claims.

It is claimed and desired to secure by Letters Patent:

1. A flow control system for use in an aircraft for controllably dispensing a fluid from a tank having a variable opening contained therein comprising:
    a sensor for indicating a volume of the fluid in the tank;
    a controller responsive to said sensor, said controller being operatively coupled with a command generator that produces a flow control signal having a predefined fluid dynamics compensating profile as a function of time that represents a target remnant fluid volume;
    a control mechanism operatively coupled with said controller and responsive to said flow control signal for varying the opening of the tank controllably to dispense the fluid therefrom in accordance with said predefined profile; and
    an aircraft groundspeed sensor, wherein said controller further is responsive to the sensed groundspeed of the aircraft to produce said flow control signal, thereby to compensate for such sensed groundspeed.

2. The system of claim 1, wherein said controller includes a comparator that continuously compares a remnant fluid volume with said predefined and produces feedback to said controller that is proportional to the difference therebetween.

3. The system of claims 1 or 2, wherein said predefined profile is declining at a fixed rate over time.

4. A method of controlling the rate at which fluid is dropped from a fire-fighting aircraft comprising:
    periodically sensing a groundspeed of the aircraft equipped with a fire retardant fluid reservoir, during an overflight by such aircraft, to produce a groundspeed-indicating signal proportional thereto, and responsive to said signal, modifying a degree of reservoir opening, thereby to maintain a substantially constant fluid drop rate during the overflight.

5. A flow control system for use in an aircraft for controllably dispensing a fluid from a tank having a variable opening contained therein comprising:
- a first sensor for indicating a volume of the fluid in the tank;
- a second sensor for indicating a groundspeed of the aircraft;
- a controller responsive to said first and second sensors, said controller being operatively coupled with a command generator that produces a flow control signal having a predefined profile as a function of time that represents a target remnant fluid volume, said command generator being responsive to flow dynamics of a fluid volume being emptied from the tank and responsive also to speed dynamics of said aircraft, said controller producing said flow control signal comprehensive of such flow and speed dynamics; and
- a control mechanism operatively coupled with said controller and responsive to said flow control signal for automatically varying the opening of the tank to dispense the fluid therefrom in accordance with said predefined profile.

6. The system of claim 5, which further comprises a feedback stabilization circuit operatively coupled with said controller to stabilize the same.

7. A flow control system for use in an aircraft for controllably dispensing a fluid from a tank having a variable opening contained therein comprising:
- a sensor for indicating a volume of the fluid in the tank;
- a controller responsive to said sensor, said controller being operatively coupled with a command generator that produces a flow control signal having a predefined profile as a function of time that represents a target remnant fluid volume;
- a control mechanism operatively coupled with said controller and responsive to said flow control signal for varying the opening of the tank controllably to dispense the fluid therefrom in accordance with said predefined profile; and
- an aircraft ground speed sensor, wherein said controller further is responsive to a sensed ground speed of the aircraft to produce said flow control signal, thereby to compensate for such sensed ground speed.

8. The system of claim 7, wherein said controller includes a comparator that continuously compares a remnant fluid volume with said predefined profile and produces feedback to said controller that is proportional to the difference therebetween.

9. The system of claims 7 or 8, wherein said predefined profile is declining at a fixed rate over time.

10. A flow control system for use in an aircraft for controllably dispensing a fluid from a tank having a variable opening contained therein comprising:
- a sensor for indicating a volume of the fluid in the tank;
- a controller responsive to said sensor, said controller being operatively coupled with a command generator that produces a flow control signal having a predefined fluid dynamics compensating profile as a function of time that represents a target remnant fluid volume wherein the predefined fluid dynamics compensating profile is a non-linear relationship between a rate of door panel opening verses time; and
- a control mechanism operatively coupled with said controller and responsive to said flow control signal for varying the opening of the tank controllably to dispense the fluid therefrom in accordance with said predefined profile.

11. The control system of claim 10 wherein the profile includes an acceleration phase, a pinch-off phase, a declining mass phase, an emptying phase and a closure phase.

* * * * *